US012754307B2

(12) United States Patent
Kim et al.

(10) Patent No.: US 12,754,307 B2
(45) Date of Patent: Oct. 6, 2026

(54) RADAR POINT CLOUD-BASED POSTURE DETERMINATION SYSTEM

(71) Applicant: SMART RADAR SYSTEM, INC., Seongnam-si (KR)

(72) Inventors: Soung On Kim, Seoul (KR); Myung Ku Kang, Gunpo-si (KR)

(73) Assignee: SMART RADAR SYSTEM, INC., Seongnam-si (KR)

( * ) Notice: Subject to any disclaimer, the term of this patent is extended or adjusted under 35 U.S.C. 154(b) by 371 days.

(21) Appl. No.: 17/924,361

(22) PCT Filed: Aug. 25, 2021

(86) PCT No.: PCT/KR2021/011367
§ 371 (c)(1),
(2) Date: Nov. 10, 2022

(87) PCT Pub. No.: WO2022/059955
PCT Pub. Date: Mar. 24, 2022

(65) Prior Publication Data
US 2023/0184921 A1 Jun. 15, 2023

(30) Foreign Application Priority Data
Sep. 15, 2020 (KR) ........................ 10-2020-0118235

(51) Int. Cl.
*G01S 13/62* (2006.01)
*G01S 7/41* (2006.01)

(52) U.S. Cl.
CPC ................ *G01S 13/62* (2013.01); *G01S 7/41* (2013.01)

(58) Field of Classification Search
CPC .............................. A61B 5/1117; G01S 13/62
See application file for complete search history.

(56) References Cited

U.S. PATENT DOCUMENTS

| | | | | |
|---|---|---|---|---|
| 2020/0143656 A1 | 5/2020 | Li et al. | | |
| 2023/0142676 A1* | 5/2023 | Zhang | G06T 7/248 | 382/100 |

FOREIGN PATENT DOCUMENTS

| | | | |
|---|---|---|---|
| JP | 2016-206026 A | | 12/2016 |
| JP | 2018-205175 A | | 12/2018 |
| JP | 2019158862 A | * | 9/2019 |
| KR | 10-1404655 B1 | | 6/2014 |
| KR | 10-2019-0095592 A | | 8/2019 |
| KR | 10-2060761 B1 | | 12/2019 |

OTHER PUBLICATIONS

Jin et al., mmFall: Fall Detection using 4D MmWave Radar and a Hybrid Variational RNN AutoEncoder, Jul. 2020, IEEE, IEEE Transactions on Automation Science and Engineering, pp. 1-13 (Year: 2020).*

(Continued)

*Primary Examiner* — Vladimir Magloire
*Assistant Examiner* — Eric K Hodac

(57) ABSTRACT

Provided is a radio detection and ranging (radar) point cloud-based posture determination system, which clusters a point cloud acquired using radar to generate a cluster, calculates predefined features of the cluster, and determines a posture of a target through a deep learning model that has trained the calculated features.

14 Claims, 5 Drawing Sheets

(56) References Cited

OTHER PUBLICATIONS

International Search Report mailed Dec. 28, 2021 for International Application No. PCT/KR2021/011367 and its English translation.
European Search Report dated Mar. 21, 2024 for Application No. 21869578.1.
Feng Jin et al., 'mmFall: Fall Detection using 4D MmWave Radar and a Hybird Variational RNN AutoEncoder', Jul. 28, 2020, pp. 1-13, arXiv:2003.023864v4.

* cited by examiner

RADAR POINT CLOUD-BASED POSTURE DETERMINATION SYSTEM

CROSS-REFERENCE TO RELATED APPLICATIONS

This application is a National Phase Entry of International Application No. PCT/KR2021/011367, filed Aug. 25, 2021, which claims priority and benefits of Korean Application No. 10-2020-0118235, filed Sep. 15, 2020, the disclosures of which are incorporated herein by reference in their entirety.

TECHNICAL FIELD

The present invention relates to a system for recognizing a posture of a target, and more particularly, to a system for recognizing a posture of a target based on radio detection and ranging (radar) point cloud data using an artificial neural network.

BACKGROUND ART

Radio detection and ranging (radar) is a detection system that emits a radio signal to a target and receives a signal reflected back by the target to detect the presence, distance, and shape of the target. Radar can acquire information about a target even in the absence of light.

Radar was initially used for military purposes, but with the development of technology, radar is being used in various fields such as meteorological observation, mapping, and the like. Three-dimensional (3D) point cloud data acquired from a radar signal may be used to determine a posture of a target, in particular, to detect whether the old and the infirm, such as the elderly and the like, have fallen. However, the determination of the posture of the target or the like should be processed in real time, and high accuracy is required.

DISCLOSURE

Technical Problem

The present invention is directed to providing a posture determination system for determining a posture of a target in real time using radio detection and ranging (radar) technology.

The present invention is also directed to providing a posture determination system for tracking a posture of a target and determining whether a fall has occurred.

Technical Solution

One aspect of the present invention provides a radio detection and ranging (radar) point cloud-based posture determination system including a data collection unit, a clustering unit, a feature calculation unit, and a posture determination unit.

The data collection unit may acquire three-dimensional (3D) point cloud data for a target using radar, the clustering unit may cluster the acquired 3D point cloud data to generate a point cluster of the target, the feature calculation unit may calculate predefined features on the basis of the generated point cluster, and the posture determination unit may determine a posture of the target on the basis of the calculated features of the point cluster through a deep learning model trained to classify the posture of the target on the basis of the predefined features of the point cluster.

The data collection unit may repeatedly acquire 3D point cloud data for each frame with respect to the target at preset frame intervals. In this case, the clustering unit and the feature calculation unit may also perform the cluster generation and the feature calculation for each frame, and the posture determination unit may determine the posture of the target for each frame.

Among the features that are provided as input data of the deep learning model of the posture determination unit, features calculated for a current frame may include features calculated for at least one previous frame.

The data collection unit may collect the 3D point cloud data including a plurality of targets, the clustering unit may generate a plurality of point clusters on the basis of the 3D point cloud data, the feature calculation unit may calculate features for each of the plurality of point clusters, and the posture determination unit may determine a posture of the target on the basis of the features calculated for each point cluster.

The radar point cloud-based posture determination system may further include a tracking unit and a fall detection unit.

The tracking unit may track a change of a position of the point cluster of the target, and the fall detection unit may detect whether a fall has occurred on the basis of the tracked change of the posture of the target.

Advantageous Effects

A posture determination system of the present invention can determine a posture of a target in real time by learning the distribution characteristics of each point, without using each point of a point cloud acquired through radio detection and ranging (radar) as a learning target.

Further, the posture determination system of the present invention can track the determined posture of the target and determine whether a fall has occurred on the basis of a history of changes in posture.

MODES OF THE INVENTION

The above-described and additional aspects are embodied through embodiments described with reference to the accompanying drawings. It is understood that various combinations are possible within the embodiments as long as there is no contradiction between components of each embodiment. Each block in a block diagram may in some cases represent a physical component, but in other cases may be a logical representation of a part of a function of one physical component or a function across a plurality of physical components. In some cases, a block or an entity of a part thereof may be a set of program instructions. All or some blocks may be implemented by hardware, software, or a combination thereof.

Figure 1:
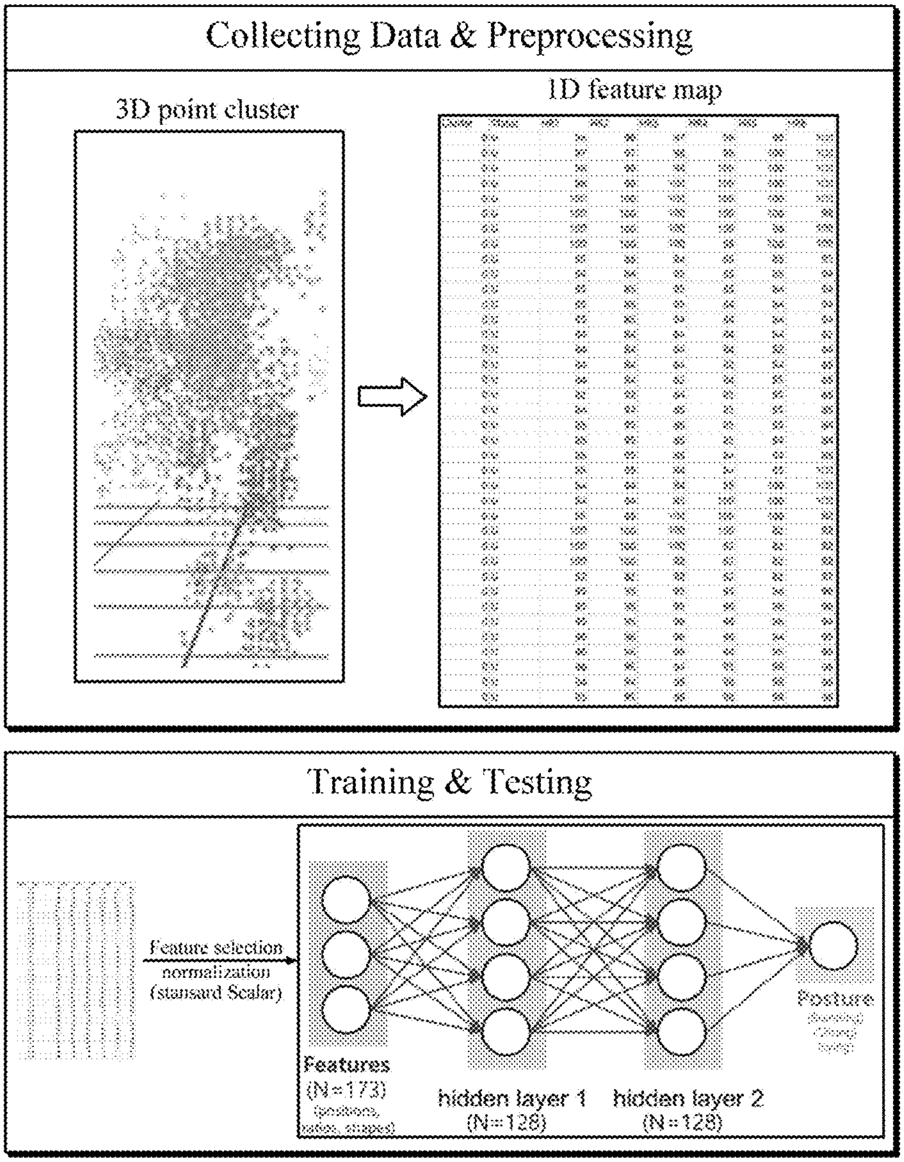
FIG. 1 is a set of diagrams showing an operation concept of a posture determination system of the present invention.

FIG. 1 is a set of diagrams showing an operation concept of a posture determination system of the present invention. A three-dimensional (3D) point cluster shown in FIG. 1 is a cluster of points in a 3D point cloud collected by a posture determination system 100 through radio detection and ranging (radar). In this case, the clustering algorithm used is not limited, and a density-based spatial clustering of applications with noise (DBSCAN) algorithm that uses density-based clustering may be used, and alternatively, a K-means clustering algorithm or a hierarchical clustering algorithm that uses a distance between clusters may be used. The posture determination system 100 does not classify the posture of the target by learning the points themselves, but classifies the posture of the target by extracting features from the point cluster, and learning the extracted features. The extracted features may include a feature related to a position of the cluster, a feature for a distribution ratio, a feature for a shape, and the like. A feature map shown in FIG. 1 is information about the features extracted from the point cluster, and features to be extracted are predefined.

The posture determination system 100 learns the features extracted from the point cluster through a deep learning model 142 and classifies the posture of the target on the basis of the features. The posture classified by the posture determination system 100 may be classified as a standing posture, a sitting posture, or a lying posture. However, the present invention is not limited thereto, and in addition to the above-described three postures, the postures may be classified into more subdivided postures, such as intermediate postures between the three postures, for example, a posture from standing to sitting and the like. Further, a type of the deep learning model 142 used in this case is not limited. For example, the deep learning model 142 may be a multi-layer neural network (MLP) model, as shown in FIG. 1, and although not shown, may be a convolutional neural network (CNN) model or a recurrent neural network (RNN) model. The posture determination system 100 may appropriately modify or preprocess input data according to the deep learning model 142 that uses a feature map in which the defined features are expressed.

Figure 2:
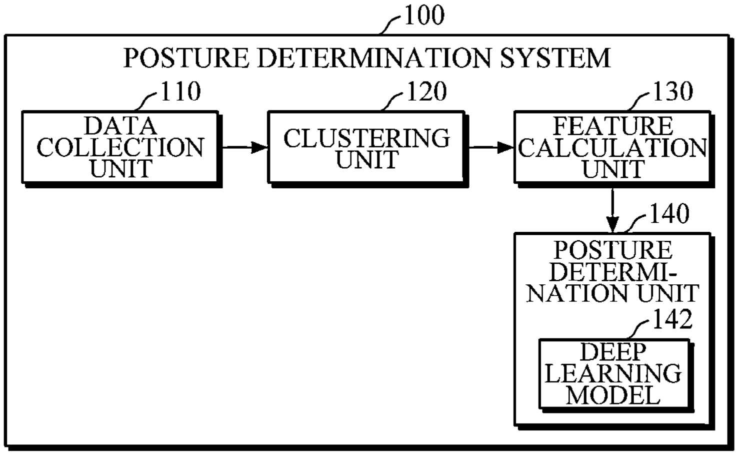
FIG. 2 is a block diagram of a posture determination system according to an aspect of the present invention.

FIG. 2 is a block diagram of a posture determination system according to an aspect of the present invention. According to an aspect of the present invention, a radar point cloud-based posture determination system 100 includes a data collection unit 110, a clustering unit 120, a feature calculation unit 130, and a posture determination unit 140.

The data collection unit 110 acquires 3D point cloud data for a target using radar. That is, the data collection unit 110 processes a radar reflection signal received by being reflected by the target, that is, radar signal data, and acquires a radar image expressed as a point cloud, which is a structured point set positioned on spatial coordinates. The data collection unit 110 may be implemented as a program instruction set, at least a part of which is executed in a computing device including a memory and a processor. Further, the data collection unit 110 includes a radar device including an antenna that emits a radar signal and collects a reflected signal.

Each of points of the point cloud acquired by the data collection unit 110 is non-deterministic data. That is, even for the same target with no change in motion, the points acquired in a previous frame may not be acquired in a next frame.

The clustering unit 120 clusters the 3D point cloud data acquired by the data collection unit 110 to generate a point cluster of the target. The generated point cluster of the target may include a noise point acquired through radar, and include a point acquired by being reflected by an object other than the target. The clustering unit 120 may cluster the 3D point cloud using a DBSCAN algorithm to generate the point cluster. The DBSCAN algorithm is a density-based clustering algorithm, and when m or more points are present within a distance ε (epsilon) based on a point p, the point p is referred to as a central point (core point) and m points are recognized as one cluster, and when a point belongs to the cluster based on the point p but there are less than m points within the distance c based on the corresponding point, the corresponding point is referred to as a border. The DBSCAN algorithm is an algorithm that repeats the above for each point, and when the central point is within the distance c from another central point, it connects the points to cluster the points as one cluster. However, the clustering unit 120 may cluster using an algorithm other than the DBSCAN algorithm. For example, the clustering unit 120 may use a K-means clustering algorithm or a hierarchical clustering algorithm. The clustering unit 120 may be implemented as a program instruction set, at least a part of which is executed in a computing device including a memory and a processor.

The feature calculation unit 130 calculates predefined features on the basis of the generated point cluster. The features calculated by the feature calculation unit 130 include max(x_max, y_max, z_max) and min(x_min, y_min, z_min), height (z_max−z_min), width (x_max−x_min), HR 1 to 20 (height/maximum z_max of previous 1 to 20 frames), BR 1 to 20 (height/minimum z_min of previous 1 to 20 frames), HSR (height/z_max), WSR (width x_max), FR (width/height), SR ((y_max−y_min)/height), MV (moving data, 1 when the cluster is moving otherwise 0), POS X (mean of x-coordinates of the cluster), POS Y (mean of y-coordinates of the cluster), POS Z (mean of z-coordinates of the cluster), XV (x-axis variance of the cluster), YV (y-axis variance of the cluster), ZV (z-axis variance of the cluster), DA (value obtained by dividing the sum of doppler values of the points by a total number of points in the cluster), or the like in each axis direction of coordinates of points included in the cluster in a 3D space, and are defined. The predefined features are acquired by predefining a combination of features that can be calculated by the feature calculation unit 130, and the corresponding combination may be determined in consideration of classification accuracy, classification speed, or the like. The feature calculation unit 130 may be implemented as a program instruction set, at least a part of which is executed in a computing device including a memory and a processor.

The posture determination unit 140 includes a deep learning model 142 that is trained to classify the posture of the target on the basis of the predefined features of the point cluster. The deep learning model 142 does not learn the points themselves of the point cloud, but calculates and learns the feature on the basis of the point cluster. Since the points acquired using radar are non-deterministic as described above, it is not efficient to directly learn the points, and direct learning of a point cloud image requires time for learning and classification, and thus is not appropriate for real-time processing. Therefore, the posture determination unit 140 determines the posture of the target on the basis of the calculated features of the point cluster through the deep learning model 142. A type of the deep learning model 142 used is not limited. For example, the deep learning model 142 may be an MLP model and may be a CNN model or an RNN model. The posture determination unit 140 generates input data by converting information about the features calculated by the feature calculation unit 130, that is, a feature map, into the form appropriate for the deep learning model 142 used.

The posture determination unit 140 may output the classified posture of the target. As an example, the posture determination unit 140 may display the target in the form of a simple image, and display a result of the classification so that the corresponding image has the classified posture.

The posture determination unit 140 may be implemented as a program instruction set, at least a part of which is executed in a computing device including a memory and a processor.

According to another aspect of the present invention, the data collection unit 110 may repeatedly acquire 3D point cloud data for each frame with respect to a target at preset frame intervals. That is, the data collection unit 110 may continuously acquire 3D point cloud data through radar. 3D point cloud data is acquired for each frame, and the frame interval may be set by a user.

The clustering unit 120 continuously clusters the 3D point cloud data of the frame to generate a point cluster, and the feature calculation unit 130 calculates features of the point cluster for each frame.

The posture determination unit 140 may determine a posture of the target for each frame. That is, the posture determination system 100 of this aspect may determine and output the posture of the target in real time.

According to still another aspect of the present invention, among the features that are provided as input data of the deep learning model 142 of the posture determination unit 140, features calculated for a current frame may include features calculated for at least one previous frame.

Among the predefined features calculated by the feature calculation unit 130, the features calculated for the current frame may additionally include HSR 1 to 20, WSR 1 to 20, FR 1 to 20, SR 1 to 20, and the like for the previous frames and defined. 1 to 20 means the number of previous frames. For example, HSR 1 means an HSR of a previous frame, and HSR 10 means an HSR of a frame 10 frames before. The posture determination system 100 may learn feature information of past frames together with feature information of a current frame, and thus accuracy may be increased. Similarly, a corresponding combination of the feature information of the past frame may be determined in consideration of classification accuracy, classification speed, or the like.

According to yet another aspect of the present invention, the data collection unit 110 may collect 3D point cloud data including a plurality of targets. That is, a plurality of targets may be present in a space in which point cloud data is collected using radar, and when the plurality of targets are present, 3D point cloud data is aggregate data of points collected from signals reflected by these targets.

The clustering unit 120 may generate a plurality of point clusters on the basis of the 3D point cloud data. The clustering unit 120 may identify the clusters by assigning identifications (IDs) to the generated point clusters.

The feature calculation unit 130 may calculate features for each of the plurality of point clusters. Therefore, the feature calculation unit 130 calculates as many feature maps as the number of clusters. The posture determination unit 140 may determine a posture of the target through the deep learning model 142 for each feature map. That is, the posture determination unit 140 may determine the posture of the target on the basis of the features calculated for each point cluster. For example, when three point clusters are generated, the posture determination unit 140 may input three feature map vectors to the deep learning model 142 to output one result vector, and as another example, the posture determination unit 140 may input three feature map vectors to the deep learning model 142 one by one to acquire an output result.

Figure 3:
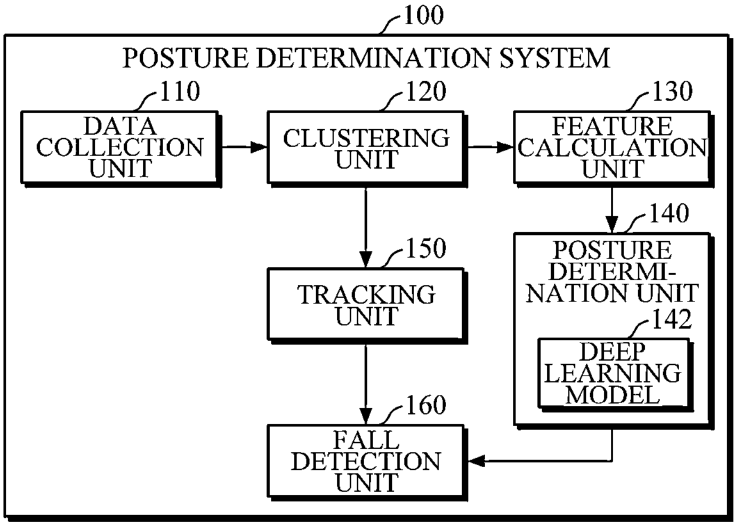
FIG. 3 is a block diagram of a posture determination system according to another aspect of the present invention.

FIG. 3 is a block diagram of a posture determination system according to another aspect of the present invention. According to an additional aspect of the present invention, the radar point cloud-based posture determination system 100 may further include a tracking unit 150 and a fall detection unit.

The tracking unit 150 tracks a change of a position of a point cluster of a target for each frame.

The fall detection unit 160 may detect whether a fall has occurred on the basis of the tracked change of the posture of the target. That is, the fall detection unit 160 may calculate posture changes of the target in previous frames, a posture change of the target in a current frame, and the time required to change the posture, and detect whether the target has fallen.

Figure 4:
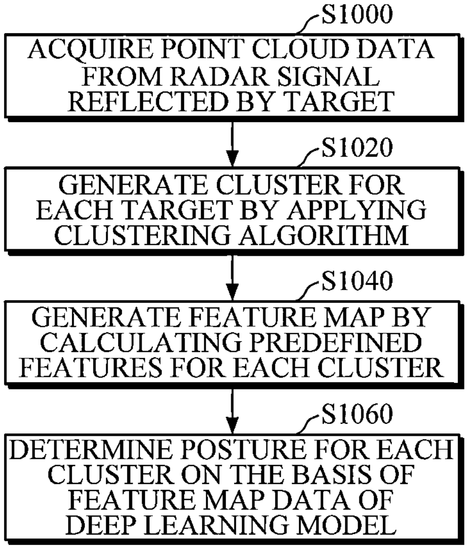
FIG. 4 is a diagram of a procedure for determining a posture according to an embodiment.

FIG. 4 is a diagram of a procedure for determining a posture according to an embodiment. As illustrated in FIG. 4, a posture determination system 100 acquires 3D point cloud data from a radar signal reflected by a target (S1000). The posture determination system 100 may continuously acquire 3D point cloud data using radar at set frame intervals. The posture determination system 100 clusters the 3D point cloud data for each target by applying a clustering algorithm (e.g., a DBSCAN algorithm) (S1020). The posture determination system 100 calculates predefined features for each cluster to generate a feature map (S1040), uses the feature map as input data of a deep learning model 142 trained to classify a posture of the target, and determines the posture for each cluster (S1060).

Figure 5:
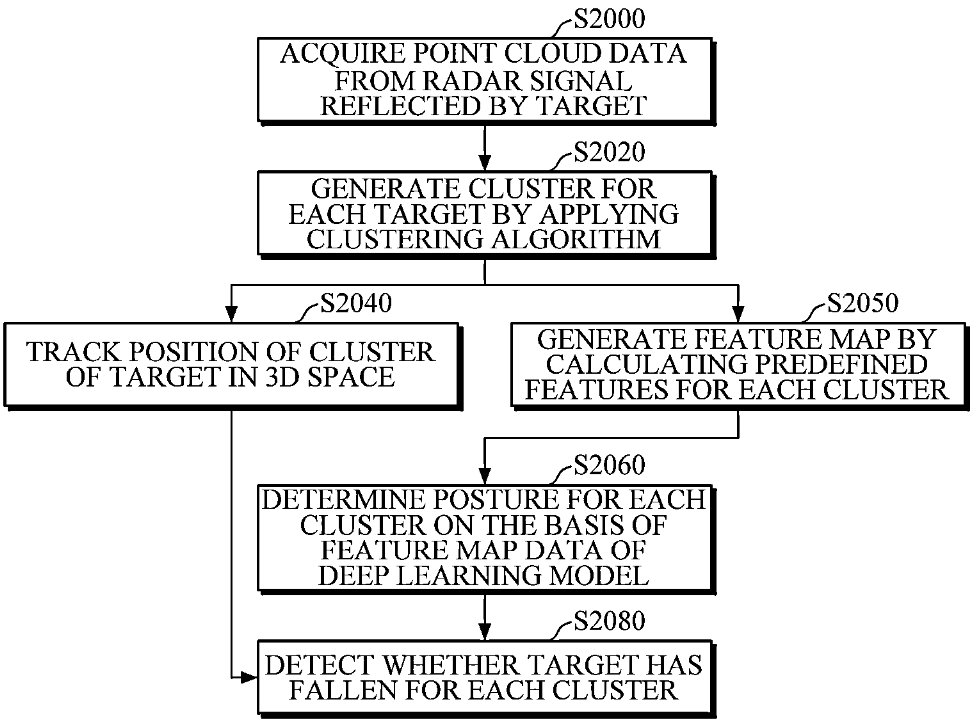
FIG. 5 is a diagram of a procedure for determining whether a fall has occurred according to another embodiment.

FIG. 5 is a diagram of a procedure for determining whether a fall has occurred according to another embodiment. As illustrated in FIG. 5, a posture determination system 100 acquires 3D point cloud data from a radar signal reflected by a target (S2000). The posture determination system 100 may continuously acquire 3D point cloud data using radar at set frame intervals. The posture determination system 100 clusters the 3D point cloud data for each target by applying a clustering algorithm (e.g., a DBSCAN algorithm) (S2020). The posture determination system 100 tracks a position of the clustered cluster (each of the clusters when a plurality of clusters are generated) in a 3D space (S2040). At the same time, the posture determination system 100 calculates predefined features for each cluster to generate a feature map (S2050), uses the feature map as input data of a deep learning model 142 trained to classify a posture of the target, and determines the posture for each cluster (S2060). The posture determination system 100 detects whether the target has fallen on the basis of a posture change between frames for each cluster and information about the time required to change the posture (S2080).

While exemplary embodiments of the present invention have been described with reference to the accompanying drawing, the present invention is not limited to the exemplary embodiments. It should be interpreted that various modifications that can be apparently made by those skilled in the art are included in the scope of the present invention. The claims are intended to cover such various modifications.

The invention claimed is:

1. A radio detection and ranging (radar) point cloud-based posture determination system comprising:

a memory; and a processor, wherein the processor, when executing program instructions stored in the memory, is configured to perform:

a data collecting operation of acquiring three-dimensional (3D ) point cloud data for a target using radar;

a clustering operation of clustering the 3D point cloud data to generate a point cluster of the target;

a feature calculating operation of calculating predefined statistical features on the basis of the generated point cluster; and a posture determining operation of determining a posture of the target on the basis of the calculated statistical features of the point cluster through a deep learning model trained to classify the posture of the target on the basis of the predefined statistical features of the point cluster, wherein the predefined statistical features include:

(i) spatial distribution features including maximum values and minimum values of coordinates of points included in the point cluster in each axis direction of a 3D space, a height calculated as a difference between a maximum z-coordinate and a minimum z-coordinate of the point cluster, a width calculated as a difference between a maximum x-coordinate and a minimum x-coordinate of the point cluster, mean values of coordinates of the points in each axis direction, and variance values of the coordinates in each axis direction;

(ii) shape ratio features including ratios between the spatial distribution features:

(iii) temporal ratio features including a ratio of the height of the point cluster in a current frame to a maximum z-coordinate value or a minimum z-coordinate value of the point cluster in at least one previous frame; and (iv) motion features including a doppler average value obtained by dividing a sum of doppler values of the points by a total number of points in the point cluster;

wherein the deep learning model classifies the posture of the target by using, as input data, a feature map generated from the calculated statistical features, without using the point cluster of the target, and wherein the statistical features from which the feature map for a current frame is generated include features that are computed based on data of the point cluster from at least one previous frame.

2. The radar point cloud-based posture determination system of claim 1, wherein the data collecting operation repeatedly acquires the 3D point cloud data for each frame with respect to the target at preset frame intervals, and the posture determining operation determines the posture of the target for each frame.

3. The radar point cloud-based posture determination system of claim 1, wherein the data collecting operation collects the 3D point cloud data including a plurality of targets, the clustering operation generates a plurality of point clusters on the basis of the 3D point cloud data, the feature calculating operation calculates statistical features for each of the plurality of point clusters, and the posture determining operation determines a posture of the target on the basis of the statistical features calculated for each point cluster.

4. The radar point cloud-based posture determination system of claim 1, wherein the processor is further configured to perform:

a tracking operation of tracking a change of a position of the point cluster of the target; and a fall detecting operation of detecting whether a fall has occurred on the basis of the tracked change of the posture of the target.

5. The radar point cloud-based posture determination system of claim 1, wherein each feature among the predefined statistical features corresponds to a different posture of the target.

6. The radar point cloud-based posture determination system of claim 1, wherein the posture determining operation classifies the posture of the target as one of a standing posture, a sitting posture, and a lying posture.

7. The radar point cloud-based posture determination system of claim 1, wherein the predefined statistical features include at least one of maximum values, minimum values, a height, and a width of the point cluster in each axis direction of coordinates of points included in the cluster in a 3D space.

8. A method of determining a posture of a target, the method comprising:

acquiring three-dimensional (3D ) point cloud data for the target using radar;

clustering the 3D point cloud data to generate a point cluster of the target;

calculating predefined statistical features on the basis of the generated point cluster; and determining a posture of the target on the basis of the calculated statistical features of the point cluster through a deep learning model trained to classify the posture of the target on the basis of the predefined statistical features of the point cluster, wherein the predefined statistical features include:

(i) spatial distribution features including maximum values and minimum values of coordinates of points included in the point cluster in each axis direction of a 3D space, a height calculated as a difference between a maximum z-coordinate and a minimum z-coordinate of the point cluster, a width calculated as a difference between a maximum x-coordinate and a minimum x-coordinate of the point cluster, mean values of coordinates of the points in each axis direction, and variance values of the coordinates in each axis direction;

(ii) shape ratio features including ratios between the spatial distribution features;

(iii) temporal ratio features including a ratio of the height of the point cluster in a current frame to a maximum z-coordinate value or a minimum z-coordinate value of the point cluster in at least one previous frame; and (iv) motion features including a doppler average value obtained by dividing a sum of doppler values of the points by a total number of points in the point cluster;

wherein the deep learning model classifies the posture of the target by using, as input data, a feature map generated from the calculated statistical features, without using the point cluster of the target, and wherein the statistical features from which the feature map for a current frame is generated include features that are computed based on data of the point cluster from at least one previous frame.

9. The method of claim 8, wherein the acquiring of the 3D point cloud data repeatedly acquires the 3D point cloud data for each frame with respect to the target at preset frame intervals, and the determining of the posture determines the posture of the target for each frame.

10. The method of claim 8, wherein the acquiring of the 3D point cloud data acquires the 3D point cloud data including a plurality of targets, the clustering of the 3D point cloud data generates a plurality of point clusters on the basis of the 3D point cloud data, the calculating of predefined statistical features calculates features for each of the plurality of point clusters, and the determining of the posture determines a posture of the target on the basis of the statistical features calculated for each point cluster.

11. The method of claim 9, further comprising:

tracking a change of a position of the point cluster of the target; and detecting whether a fall has occurred on the basis of the tracked change of the posture of the target.

12. The method of claim 8, wherein each feature among the predefined features corresponds to a different posture of the target.

13. The method of claim 8, wherein the determining of the posture classifies the posture of the target as one of a standing posture, a sitting posture, and a lying posture.

14. The method of claim 8, wherein the predefined features include at least one of maximum values, minimum values, a height, and a width of the point cluster in each axis direction of coordinates of points included in the cluster in a 3D space.

* * * * *